(12) United States Patent
Walker et al.

(10) Patent No.: US 12,311,956 B2
(45) Date of Patent: May 27, 2025

(54) GRADE SEVERITY DETECTION

(71) Applicant: Curtis Instruments, Inc., Mount Kisco, NY (US)

(72) Inventors: Brian M Walker, Livermore, CA (US); Johannes Boot, Oakland, CA (US)

(73) Assignee: Curtis Instruments, Inc., Mount Kisco, NY (US)

( * ) Notice: Subject to any disclaimer, the term of this patent is extended or adjusted under 35 U.S.C. 154(b) by 306 days.

(21) Appl. No.: 17/826,868

(22) Filed: May 27, 2022

(65) Prior Publication Data

US 2023/0382405 A1    Nov. 30, 2023

(51) Int. Cl.
*B60W 40/11* (2012.01)
*B60W 40/13* (2012.01)

(52) U.S. Cl.
CPC ............ *B60W 40/11* (2013.01); *B60W 40/13* (2013.01); *B60W 2040/1315* (2013.01); *B60W 2510/0657* (2013.01)

(58) Field of Classification Search
CPC .................. B60W 40/11; B60W 40/13; B60W 2040/1315; B60W 2510/0657
See application file for complete search history.

(56) References Cited

U.S. PATENT DOCUMENTS

| | | | |
|---|---|---|---|
| 4,915,328 A | 4/1990 | Nakamoto | |
| 6,033,041 A | 3/2000 | Koga et al. | |
| 6,748,311 B1 | 6/2004 | Walenty et al. | |
| 7,024,290 B2 | 4/2006 | Zhao et al. | |
| 7,962,256 B2 | 6/2011 | Stevens et al. | |
| 8,346,417 B2 | 1/2013 | Tang et al. | |
| 8,423,258 B2 | 4/2013 | Robinson et al. | |
| 8,862,300 B2 | 10/2014 | Ichinose et al. | |
| 8,935,032 B2 | 1/2015 | Kato et al. | |
| 9,315,116 B2 * | 4/2016 | Kobayashi | B60L 15/2009 |
| 9,688,161 B2 | 6/2017 | Zhang et al. | |
| 10,029,581 B2 | 7/2018 | Cho | |
| 10,300,795 B2 | 5/2019 | Sawada | |
| 10,421,361 B2 | 9/2019 | Cho | |

(Continued)

FOREIGN PATENT DOCUMENTS

| CN | 114347806 A | 4/2022 |
|---|---|---|
| JP | 2002262411 A | 9/2002 |

(Continued)

OTHER PUBLICATIONS

Search Report issued in counterpart European Application No. 23175180.1 on Oct. 23, 2023.

*Primary Examiner* — Naeem Taslim Alam
(74) *Attorney, Agent, or Firm* — The Belles Group, P.C.

(57) ABSTRACT

An apparatus for grade severity detection in a motorized vehicle includes a first sensor and a second sensor that provides data to a controller. The first sensor is configured to generate motion data indicative of at least one wheel of the motorized vehicle. The second sensor generate data, which is indicative of torque for at least one wheel of the motorized vehicle. The controller is configured to calculate a pitch of the motorized vehicle based on the torque data and one or more acceleration values derived from the position data and configured to perform a comparison of the calculated pitch to a pitch threshold. A grade severity message is generated based on the comparison.

17 Claims, 10 Drawing Sheets

(56) References Cited

U.S. PATENT DOCUMENTS

| | | | |
|---|---|---|---|
| 10,532,729 B2 | 1/2020 | Ito et al. | |
| 10,632,978 B2 | 4/2020 | Gustafsson et al. | |
| 10,967,870 B2 | 4/2021 | Ling et al. | |
| 11,192,532 B2 | 12/2021 | Park | |
| 12,037,001 B1* | 7/2024 | Bacchiani | B60W 10/10 |
| 2002/0041167 A1 | 4/2002 | Kitano et al. | |
| 2003/0103044 A1* | 6/2003 | Sunda | G06F 3/0362 |
| | | | 345/184 |
| 2007/0067085 A1* | 3/2007 | Lu | B60W 40/114 |
| | | | 340/440 |
| 2007/0072662 A1* | 3/2007 | Templeman | A63H 30/04 |
| | | | 463/6 |
| 2008/0027591 A1* | 1/2008 | Lenser | G05D 1/0038 |
| | | | 701/28 |
| 2011/0264303 A1* | 10/2011 | Lenser | G05D 1/0038 |
| | | | 701/2 |
| 2012/0290146 A1* | 11/2012 | Dedes | G01C 21/165 |
| | | | 701/1 |
| 2013/0116874 A1* | 5/2013 | Ichinose | B60L 15/20 |
| | | | 701/22 |
| 2014/0067155 A1 | 3/2014 | Yu et al. | |
| 2015/0081170 A1* | 3/2015 | Kikuchi | B60G 17/06 |
| | | | 701/37 |
| 2015/0298666 A1* | 10/2015 | Liu | B60T 8/245 |
| | | | 701/74 |
| 2016/0121862 A1* | 5/2016 | Richards | B60G 17/015 |
| | | | 701/93 |
| 2017/0356375 A1* | 12/2017 | Glugla | B60W 30/1882 |
| 2018/0024563 A1* | 1/2018 | Matsuzaki | G05D 1/0214 |
| | | | 701/41 |
| 2019/0031173 A1* | 1/2019 | Zhang | B60W 20/50 |
| 2019/0094023 A1* | 3/2019 | Diem | G01C 17/38 |
| 2019/0160999 A1* | 5/2019 | Bauch | B60Q 1/10 |
| 2019/0381894 A1 | 12/2019 | Kujubu et al. | |
| 2019/0382010 A1* | 12/2019 | Woodley | B60W 30/146 |
| 2020/0156480 A1 | 5/2020 | Park et al. | |
| 2020/0317492 A1* | 10/2020 | Bhatia | B66F 13/00 |
| 2021/0370913 A1* | 12/2021 | Yang | B60W 10/11 |
| 2022/0041061 A1* | 2/2022 | Kang | B60L 15/2018 |
| 2022/0126808 A1* | 4/2022 | Jeong | B60T 7/042 |
| 2022/0366599 A1* | 11/2022 | Okada | G06T 7/246 |
| 2023/0365110 A1* | 11/2023 | Chavrier | B60T 8/171 |
| 2023/0382380 A1* | 11/2023 | Herrero Zarzosa | G06V 20/584 |

FOREIGN PATENT DOCUMENTS

| | | |
|---|---|---|
| JP | 2003335230 A | 11/2003 |
| JP | 2005045864 A | 2/2005 |
| JP | 2016013776 A | 1/2016 |
| WO | 2021199863 A1 | 10/2021 |
| WO | 2022043153 A1 | 3/2022 |
| WO | 2022048267 A1 | 3/2022 |
| WO | 2022070658 A1 | 4/2022 |

* cited by examiner

GRADE SEVERITY DETECTION

FIELD

The present application relates to grade detection in electric vehicles.

BACKGROUND

An electric vehicle includes one or more motors that operate on battery power or other electric only sources. The term electric vehicle may be distinct from an electric car or electric automobile and encompass a wide variety of applications. Examples include construction vehicles such as mobile aerial lifts, forklifts, and others. These vehicles may include control systems to provide automated motion control and safety mechanisms. One challenge in motion control occurs when electric vehicles travel on inclined planes or ramps.

BRIEF DESCRIPTION OF THE DRAWINGS

Exemplary embodiments are described herein with reference to the following drawings, according to an exemplary embodiment.

DETAILED DESCRIPTION

Example applications for electric vehicles include aerial lifts such as mobile elevating work platforms (MEWP), recreational carts such as golf carts and all-terrain/utility vehicles, maintenance or construction vehicles such as forklifts or skid steers. The MEWP classification of vehicles includes aerial lifts, aerial work platforms (AWPs), manlifts, powered platforms and vehicle-mounted work platforms. The term MEWP is inclusive of two classes of machines intended for moving one or more persons, tools and material to working positions, including at least a work platform with controls, an extending structure and a chassis. An example of one class is a scissor lift has a work platform that lifts vertically in the zone above the chassis and above the wheels. The extending structure of the scissor lift includes crisscrossed support beams that pivot with respect to each other to extend and lift the work platform. An example of another class is a boom lift that may lift outside of the zone above the chassis. The extending structure of the boom lift may include a hydraulic arm that extends to lift the work platform.

Figure 1:
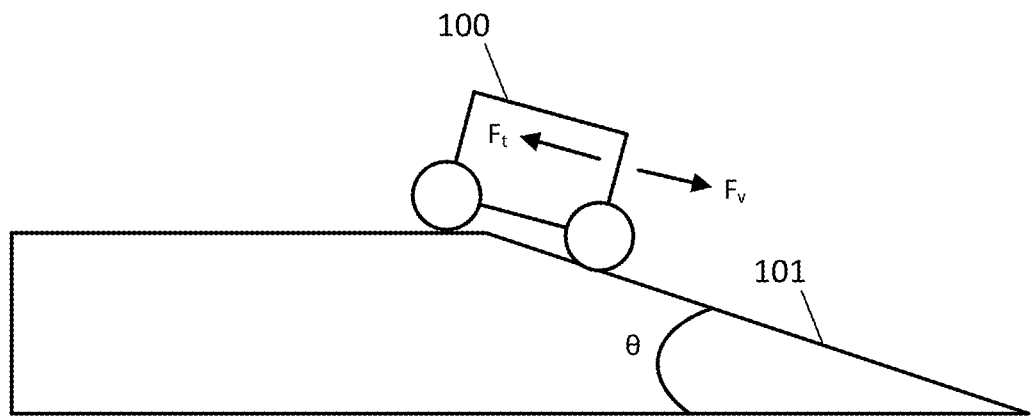
FIG. 1 illustrates an example electric vehicle on a ramp.

FIG. 1 illustrates an example vehicle 100 to represent any of these types of vehicles traveling on an example ramp 101 having an inclined plane at angle θ. The angle θ is measured from the horizontal plane (e.g., the surface of the earth or a line/plane perpendicular to the direction of gravity) such that higher positive numbers in degrees or radians indicate steeper angles for the ramp 101. As discussed in more detail below, the vehicle may include one or more motors (e.g., a motor for each wheel) and a brake that may be applied to one or more of the wheels. Vehicles in the material handling and aerial lift industries often have regulations to restrict motion when the vehicle is on such a ramp 101. When the grade of the ramp 101 is such that it goes outside the safety range, limits on vehicle motion are set in place. An example is limiting vehicle travel speed when the vehicle 100 is on a grade of a certain severity. The travel speed of the vehicle may be limited through slowing the speed of the motor or applying the brake.

Grade severity may be measured in this scenario with an inertial measurement unit (IMU) and/or a tilt sensor (TS). The IMU includes at least one gyroscope and at least one accelerometer (e.g., an accelerometer in each of three directions) to determine pitch and roll of the vehicle 100. The TS uses at least one accelerometer to determine pitch and roll. The TS may alternatively be mechanical. For example, the TS may include a metallic ball that connects two electrical points of contact when the TS reaches a predetermined angle, causing the ball to roll to the two electrical points of contact.

At least one example industry standard, for example EN 280 or EN 280-2013, defines techniques for mobile elevation work platforms where measuring the pitch and roll angles for safe vehicle operation. The standard may designate maximum speeds and maximum travel angles for ramps suitable for MEWPs. The standard may also regulate use of the platform with various speeds or travel angles for ramps.

A motor powered by alternating current (AC motor or M) may drive vehicle 100. A direct current (DC) motor may be substituted for the AC motor in any of the embodiments described herein. In some examples, each wheel is coupled to an independent motor. In some examples, an axle connects two or more wheels, is coupled to a motor. There may be multiple axles connecting pairs of wheels. Each axle may have an independent motor. In some examples, only one axle is connected to a motor.

One problem that may occur with an AC motor drive system involves maintaining safe or manageable speeds while traveling on a ramp. AC motors have relatively high torque at low speeds and relatively low torque as speed exceeds a predetermined speed range or a nominal speed that the AC motor drive was designed for. Travelling up a ramp tends to lead toward stable situation because the vehicle will slow down to a speed where motor torque increases, and the ramp can be climbed. However, when traveling downhill or down a ramp, a different situation arises. When traveling downhill, gravity may assist the vehicle in exceeding the nominal speed leading to a braking torque reduction. The braking torque reduction may cause a condition in which speed can no longer be maintained and becomes unstable. For example, the vehicle may "run-away" or travel at a high speed that cannot be immediately reduced by the control system through braking torque.

Further compounding the problem are situations where a vehicle may be driven at high speed down a steep hill with a full battery. The regenerative braking system of the vehicle may normally serve to absorb power from the drive system. However, the regenerative braking system can only transfer power to the battery when the battery can be charged. A full battery cannot be substantially charged. Thus, in situations that the battery is not able to absorb the power at a sufficient rate, the drive system is not slowed through regenerative braking.

When one of these techniques for slowing the vehicle 100 is not available or not sufficient to slow the vehicle traveling down a ramp, the tilt or pitch angle of the vehicle 100 may be used to trigger another system. For example, the IMU or TS may indicate that the pitch angle is too high and cause a backup braking system. The backup breaking system may include a mechanical brake. The mechanical brake may be mechanically in contact with one or more wheels. That is, the mechanical brake, when actuated, may apply a frictional force to the one or more wheels in order to slow the one or more wheels.

However, using an IMU or TS may involve high costs (e.g., sensor costs or other part costs), which may be prevent the use of these systems in some applications. Other problems with the TS is that relying on accelerometers directly can cause incorrect estimation of pitch and roll angles while the vehicle in in motion so filtering is required, inducing a signal delay. The output of a TS is thus not ideal for certain applications. A TS may have a latency period before showing the angle estimation output which can lead to a delay in vehicle speed restriction on a ramp. More specifically, the TS may depend on a sampling period (e.g., one sample per second). For any given condition based on TS data such a pitch angle, the detection of the condition will lag the actual condition by at least the sampling period. The sampling period for the TS is relatively high in mobile MEWP and other applications because the vehicles tent to be rigid and have little to no suspension periods. In the accelerometer data, a small bump or disturbance to one of the wheels may reflect a large pitch angle for a very short period of time. To avoid these false positives, the TS uses a large sampling period to smooth out the data, but a large sampling period inherently involves delays.

In some cases, vehicle design may not cover a case where the vehicle enters a ramp with a severe grade at a high rate of speed, not having enough braking torque to safely stop, causing a runaway condition. While AC motor control systems can monitor motor speed and supervise, setting the motors EMB to quickly stop, it is not an ideal situation for operators (e.g., unpleasant jerk in motion or risk of uncontrolled motion such as tipping or sliding, which may be at least a partial loss of traction). The IMU and/or TS may identify this condition, but the latency of the estimated pitch angle compared to true pitch may still lead to over speed conditions.

The following embodiments address these challenges by introducing a simpler and faster calculation for detecting a severe grade using rotational acceleration and torque. The IMU and/or TS techniques are not acceptable because of the latency involved in the calculation. Improving the latency to grade detection imposed a challenge to speed up the identification of a severe grade. The following embodiments slow the vehicle down to a speed where more braking torque was available after detecting a severe grade. The following embodiments may not necessarily detect the exact angle but rather identify the more general existence of a severe grade by using the values or series of values (trend) of motor torque and motor acceleration. The pitch may be an estimated value. The term pitch range or pitch indicator may include values that tend to indicate pitch within a margin of error or a general angle range. For example, pitch ranges may include 0 to 3 degrees, 3 degrees to 6 degrees, 6 degrees to 9 degrees and so on. In another example, a low pitch range is 0 to 12 degrees, and a high pitch range is 13 degrees or higher.

The detection of the grade severity may be made just as the vehicle starts to crest the ramp or proceed down the incline but before speed has substantially increased. Motor torque and motor acceleration can either be measured externally to the motor or internally estimated within the AC motor control software. When grade severity detects a ramp, the speed of the vehicle is slowed or prevented from speeding up through motor control with a faster response time than when using a TS. The response time in the following embodiments may be 100 to 200 milliseconds.

FIG. 1 shows the fundamental approach of a vehicle 100 driving onto a ramp 101 having a severe grade and the use of motor torque and motor acceleration. Various types of ramps, hills, slopes, surfaces, may be represented by the ramp 101. The angle θ may represent a threshold angle that represents a severe grade. The definition of a severe grade may vary and depend on the type of vehicle, any payload of the vehicle, the type of tires, the surface of the ramp 101, and/or other factors. The angle θ may be considered a severe grade at equal or greater than 14 degrees, 15 degrees, 20 degrees, 22.5 degrees, 30 degrees or another value. Alternatively, the severe grade may be defined as a threshold grade such as 25% grade, 30% grade, 40% grade or another value.

Referring to FIG. 1, $F_v$ corresponds to the force related to the vehicle driving down the ramp 101 (a vector of gravity's force) and $F_t$ corresponds to the force necessary to slow the vehicle 100 or stop it. $F_t$ may be provided by the motor if the motor is commanded to slow the speed of the vehicle. $F_t$ may be provided by a brake. $F_t$ must be larger than $F_v$ in order to slow the vehicle 100 when starting down the ramp 101.

Figure 2:
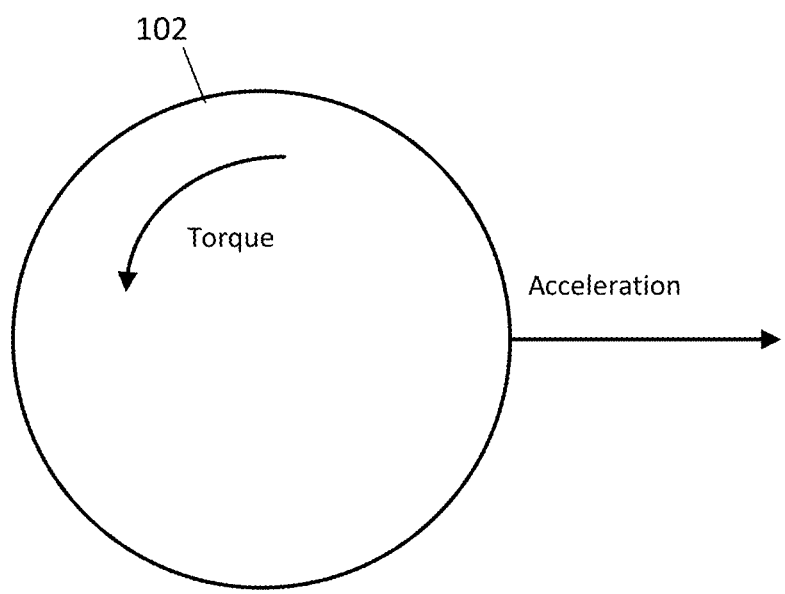
FIG. 2 illustrates an example partial free body diagram of a wheel of the electric vehicle.

FIG. 2 shows the necessary relationship between torque and vehicle acceleration on the drive wheels 102. When drive torque is in transition from drive mode to regeneration mode, and acceleration is trending in the opposite direction at the vehicle level, it can be implied the vehicle 100 is driving down the ramp 101.

Figure 3:
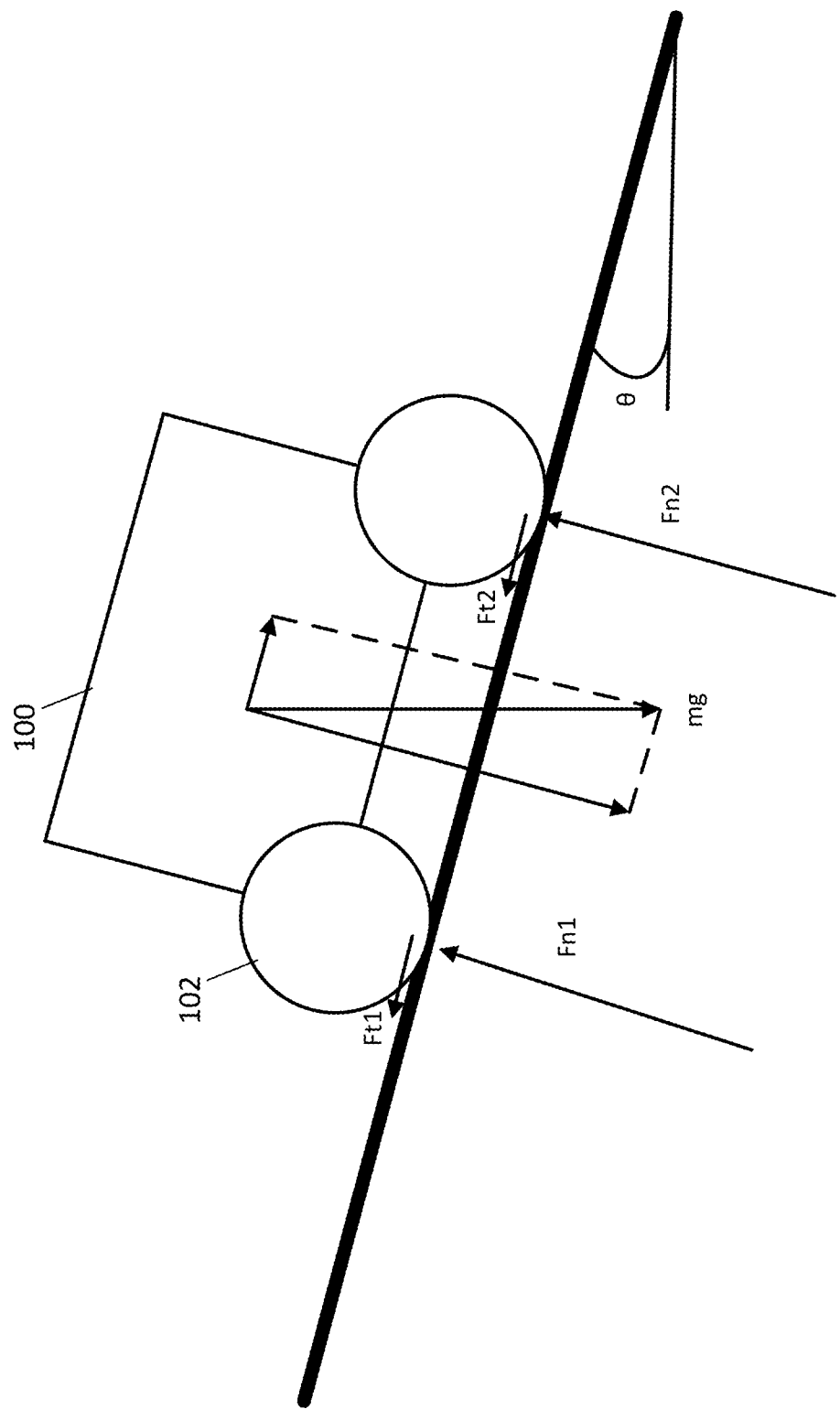
FIG. 3 illustrates an example free body diagram of the electric vehicle.

FIG. 3 illustrates an example free body diagram of the electric vehicle 100. Each of the wheels 102 is acted on by multiple forces. $F_{t1}$ and $F_{t2}$ corresponds to the force necessary to slow the vehicle 100 at each of the wheels, respectively. A normal force $F_{n1}$ and $F_{n1}$ opposes the force of gravity (mg) projected in a direction perpendicular to the surface of the ramp 101.

A simplified model of the vehicle 100 may be assumed. The vehicle 100 may move into a straight line, without slip, and hence each wheel will rotate at the same speed. When moving on flat ground in a low friction environment, the acceleration is directly caused by the sum of the torques on each wheel 102. The interactions between motor, wheel and vehicle are rigid without dynamics.

Equations 1-9 describe an example derivation of the technique to determine grade severity in the ramp 101. As discussed in more detail below, implementation may not require calculations from equations 1-9 but rather the result of the derivation may be used to model and estimate the parameters necessary to determine grade severity.

As shown by Equation 1, the wheel acceleration ($\dot{\omega}$) may be defined as the combined torque $T_{motors\ combined}$ of the drive wheels or corresponding motors (e.g., two motors or four motors) of the vehicle 100 divided by the reflected moment of inertia (J). The reflected moment of inertia (J) is the perceived inertia at the motor of the vehicle 100 (translated back to the motor).

$$\dot{\omega} = \frac{T_{motors\ combined}}{J_{reflected}} \qquad \text{Eq. 1}$$

The reflected moment of inertia (J) may depend on each portion of the vehicle 100 having substantial mass. Equation 2 describes an example calculation of the reflected moment of inertia (J) based on the moment of inertia of each of the wheels ($J_{wheel}$) the mass of the vehicle ($m_{vehicle}$), the radius of the wheel ($r_{wheel}$) and the moment of inertia of the motor ($J_{motor}$), where N is the gear ratio between the motor and the wheel, W is the number of wheels, and M is the number of motors. In many examples W=M.

$$J_{reflected\ whole\ vehicle} = (W \cdot J_{wheel} + m_{vehicle} \cdot r_{wheel}^2)/N^2 + M \cdot J_{motor} \qquad \text{Eq. 2}$$

Equation 3 provides that the torque ($T_{motors\ combined}$) of the motors combined is the summation of the torque for each motor.

$$T_{motors\ combined} = \Sigma_{i=1}^{i=n} T_{motor\ i} \qquad \text{Eq. 3}$$

Equation 4 illustrates that the total tractive force ($F_{t1} + F_{t2}$) needed for steady-state conditions depends on the force of gravity ($m_{vehicle}$*acceleration of gravity) and the sine of the pitch angle (e.g., angle θ).

$$F_t = m_{vehicle} g \sin(pitch) r_{wheel}/N \qquad \text{Eq. 4}$$

By expressing from the torque at the motor (T), the relationship is shown by Equation 5.

$$T = -m_{vehicle} g \sin(pitch) r_{wheel}/N \qquad \text{Eq. 5}$$

For small pitch angles, the equation may be linearized. That is, when the angle θ is less than a predetermined angle, sin(θ) is almost equal to θ. In some examples, it may be assumed that the ramp is always inclined at an angle to satisfy this assumption (e.g., θ is less than 20 degrees)). Equation 6 removes the sine operator.

$$T = -m_{vehicle} \cdot g \cdot pitch \cdot r_{wheel}/N \qquad \text{Eq. 6}$$

Combining the two effects, the Equation 7 establishes:

$$\dot{\omega} = \frac{T_{combined\ motors}}{J_{reflected}} + \frac{m_{vehicle} \cdot g \cdot pitch \cdot r_{wheel}}{J_{reflected} \cdot N} \qquad \text{Eq. 7}$$

And hence, through algebra, the pitch can be estimated according to Equation 8.

$$pitch = \frac{\dot{\omega} \cdot J_{reflected} \cdot N}{m \cdot g \cdot r} - \frac{T_{comined\ motors} \cdot N}{m \cdot g \cdot r} \qquad \text{Eq. 8}$$

Because in at least the example cases, there is no intent to identify the underlying parameters or constants, the various constants for each term may be collapsed into a first factor K1 and a second factor K2, as shown by Equation 9.

$$pitch = K1 \cdot \dot{\omega} - K2 T_{combined\ motors} \qquad \text{Eq. 9}$$

Therefore, the pitch of the vehicle 100 may be estimated based on the torque of the motors and the angular accelerations of wheels, or more specifically, based on the torque of the motors scaled by a first factor K1 and the angular accelerations of wheels scaled by a second factor K2. It should also be noted, that while no friction components are shown in the equations, the first factor K1 and the second factor K2 may include friction components.

In one example, the assumption that sin(θ) is almost equal to θ is not used in equation 6. Carrying through the sine term results in Equations 10 and 11.

$$\sin(pitch) = K1 \cdot \dot{\omega} - K2 \cdot T_{combined\ motors} \qquad \text{Eq. 10}$$

$$pitch = \arcsin(K1 \cdot \dot{\omega} - K2 \cdot T_{combined\ motors}) \qquad \text{Eq. 11}$$

The torque of the motors may be determined from electrical parameters of the motor (motor current and/or motor voltage and/or rotor position and/or temperature). Some torque estimations are derived from a table based on the same parameters. This determination is very fast because the motor is controlled at a high rate (e.g., a sampling rate of one kilohertz or more). The acceleration of the wheels or motor is also measured at a high rate (e.g., sampling rate of 1 kilohertz or more). The acceleration of the wheels or the motor may be a position or speed sensor on the motor.

K1 and K2 may be determined through empirical testing either in experimentation or simulation. The testing may involve varying the values for K1 and K2 while observing the operation of the vehicle over a known slope angle. For example, a vehicle 100 may be set up to approach a ramp 101 with a known pitch angle that exceeds the threshold pitch. As a control, the vehicle 100 may be run with no grade severity control to demonstrate/measure the high speed condition of the vehicle 100. The vehicle 100 may be run on the same ramp 101 with initial values for K1 and K2. If the performance or speed of the vehicle 100 is unaffected by the grade severity control or the speed is not decreased by the desired amount. The values of K1 and/or K2 may be adjusted iteratively. For example, the values of K1 and/or K2 may be increased by respective predetermined amounts. In some examples, the value for K1 is increased at predetermined iterations and the value for K2 is increased at predetermined iterations. In other examples, K1 and/or K2 may be decreased in successive iterations.

The values for K1 and K2 may vary for a variety of factors. Example factors may include the model number of the vehicle 100, the type of tires on the vehicle 100, the direction that vehicle 100 is traveling, the wheel base of the vehicle 100, the theoretical maximum speed of the vehicle 100, the payload weight of the vehicle 100, or the state of a lift platform of the vehicle 100.

Figure 4:
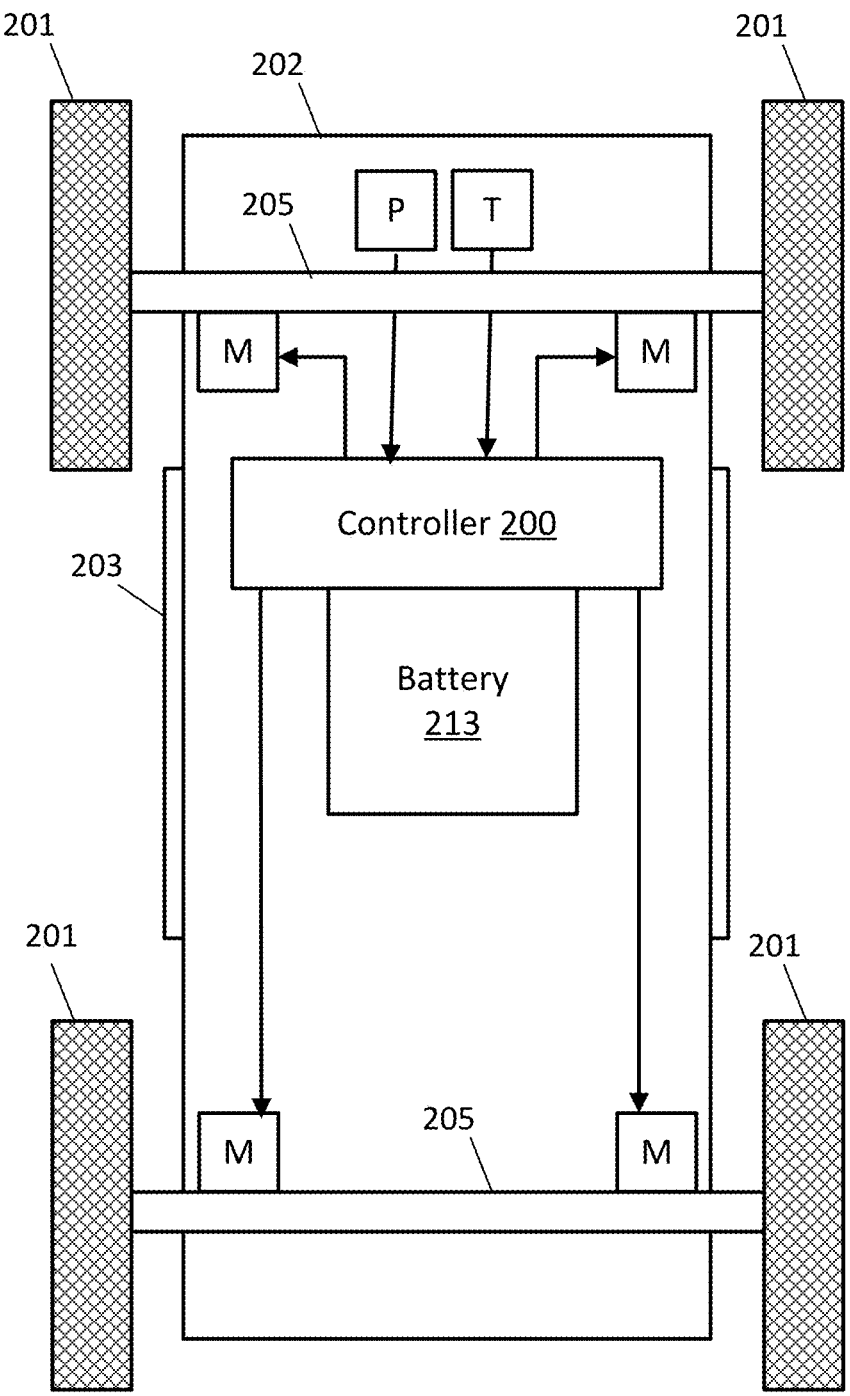
FIG. 4 illustrates the electric vehicle.

FIG. 4 illustrates an example for the electric vehicle 100. The electric vehicle 100 may include a chassis 202, a platform 203, and a number of wheels 201 (e.g., four wheels 201). The wheels 201 support the chassis 202 which includes one or more lifting mechanisms for supporting the platform 203. The lifting mechanism may include scissor levers for raising and lowering the platform 203. Pairs of wheels 201 may be connected by an axle 205, which is rotating via a drive gear or transmission connected to a motor M. The wheels 201 may be independently driven by motors M.

Depending on the drive system, the operation of the motors M, the axle 205, or the wheels 201 may be measured by one or more sensors. As illustrated, a torque sensor T effectively measures the torque, and a position sensor P effectively measures position. The torque sensor T may be implemented by a current sensor that directly measures motor current, from which the torque values are estimated, calculated, or otherwise derived.

The location of the position sensor P is illustrated in FIG. 4 for the sake of convenience of illustration but may be located in near proximity to the motors M, the axle 205, or the wheels 201 depending on the implementation. The position sensor P is configured to generate position data for at least one wheel of the vehicle 100. The position sensor P may measure movement of a component such as an axle/shaft, the gear box, transmission, wheel, motor, or another component. The position sensor may be a rotary position sensors or an angular position sensors. Various types of position sensing technologies may be used including resistance, inductive, capacitive, magnetic, eddy current, hall-effect, or optical sensor. In one example, the position sensor P may detect a portion (e.g., an indicia or mark) on a shaft or rotor of the motor.

A controller 200 may receive data from the torque sensor T and the position sensor P and perform the grade severity detection. The controller 200 is configured to calculate a pitch of the motorized vehicle based on the torque data and the position data. Specifically, the one or more acceleration values may be derived from the position data through differentiating the data. The position data may be differentiated once for velocity and twice for acceleration. The controller 200 is configured to differentiate the position data to determine the one or more acceleration values of the motorized vehicle.

The controller 200 may calculate the pitch also based on one or more factors. An example calculation is in Equation 9 above with example factors K1 and K2. The controller 200 is configured to apply a first factor to the one or more acceleration values and apply a second factor to the torque data for the calculation of the pitch. Other calculations and factors may be possible.

The controller 200 configured to perform a comparison of the calculated pitch to a pitch threshold. The controller 200 may access the pitch threshold from memory. The pitch threshold may correspond to the (generally accepted) angle that vehicles may suffer the "run-away" condition when traveling over. Example angles may be 15 degrees or 20 degrees. The pitch threshold may be variable. The pitch threshold may be selected based on the vehicle 100. The pitch threshold may correspond to the angle that the vehicle 100 can travel without exceeding the torque braking ability of the motor. The pitch threshold may be selected based on the motor.

The pitch threshold may be selected based on the class of vehicle. For example, a predetermined pitch threshold may be applied to MEWP. The pitch threshold may be selected based on the manufacturer of the vehicle 100.

The pitch threshold may be varied in real time. In one example, a speed sensor detects the speed of the vehicle 100 and the controller 200 adjusts the pitch threshold as a function of speed. A low pitch threshold may be used at high speeds and a higher pitch threshold may be used at lower speeds. In another example, a weight (e.g., total weight or payload weight) is measured by a weight sensor, and the controller 200 adjusts the pitch threshold may be varies as a function of weight. A low pitch threshold may be used at low weights and a high pitch threshold may be used at high weights.

The pitch threshold may be set according to the use of the vehicle 100. For example, for certain uses (e.g., transportation) likely to face high speeds, a low pitch threshold may be used, and for uses unlikely to face high speeds, a high pitch threshold may be used.

The pitch threshold may be set according to the environment of the vehicle 100. For environments (e.g., outdoor terrain) likely to include slopes or hills, a low pitch threshold may be used, and for environments (e.g., indoor) unlikely to include slopes or hills, a high pitch threshold may be used.

In another example, the pitch threshold may be set according to the users (e.g., based on preference or driving history). The user may enter the pitch threshold through a keypad, dial, or other setting. The user may enter the pitch threshold through wireless communication.

In some instances, a rigid pitch threshold may cause the system to switch back and forth between detection and non-detection of grade severity. That is, when the data for torque and angular acceleration indicates that the pitch angle is very near the threshold, small disturbances, noise, or other variations may cause the result to change rapidly. To counteract this phenomenon, a hysteresis may be used. For example, instead the result of the grade severity determination may be locked in for a predetermined time period after a positive (threshold exceeded) result. Example time periods may be 200 or 500 milliseconds. The controller 200 may set the time interval in response to a determination that the pitch threshold has been exceed. The controller 200 performs a subsequent comparison after the time interval has elapsed. In another example, the controller 200 may change the pitch threshold after the determination of the pitch threshold has been exceeded. For example, one the pitch threshold has been exceeded, the pitch threshold is lowered so that subsequent data does not immediately push the result back below the pitch threshold. In this way, the controller 200 selects the pitch threshold from a pitch range spanning a minimum pitch threshold value and a maximum pitch threshold value. To prevent false trips, a numerical band, in combination with a time threshold, should be set to detect a severe grade situation only.

The controller 200 may access the factors (e.g., K1 and K2) in a variety of techniques. The factors may be stored ahead of time in memory. The memory may also include a variety of values for the factors for a variety of conditions or equipment. For example, the memory may include a matrix or a lookup table including several factors. The controller 200 may access the matrix or lookup table to select the factors. In one example, the controller 200 is operable with multiple models of vehicle 100 and the controller 200 is configured to query the lookup table for first factor and/or the second factor according to a model of the motorized vehicle 100. The controller 200 may have a setting (e.g., dip switch) or software loaded that causes the controller 200 to axis particular factors.

The factors may also vary according to geographic region, time of day, day of the year, local standards or regulations, user preferences, or other reasons. The factors may also be varied according to any of the examples described herein for the pitch angle threshold.

The controller 200 is configured to generate a grade severity message based on the comparison of the calculated pitch angle and the pitch threshold. The term grade severity message encompasses messages to electrical or mechanical devices (e.g., commands) or alphanumeric messages to users (e.g., display prompt).

In the alternative or in addition to discrete values for the torque of the motors and the angular acceleration as shown in Equation 9, a series of values such as a trend, or rate of change may be used. When acceleration is increasing by a predetermined amount and torque is decreasing by a predetermined amount, the grade severity message is generated by the controller 200.

The grade severity message may include a command for the motor M. The command for the motor M may be a target motor current value or a target speed value. The command for the motor M may be an adjustment to a target motor current value or an adjustment to a target speed value. The controller 200 may apply the command for the motor M to a speed control feedback loop associated with the at least one wheel.

The grade severity message may include a command for a brake of the vehicle 100. The brake may be a mechanical device that is actuated by a solenoid, cable, or other brake drive. The brake is configured to place a force (e.g., friction) on a wheel, shaft, or other component in order to slow the vehicle 100.

The grade severity message may include a message for the user. The message may be an alert or a warning (e.g., pitch angle exceeded, emergency sequence activated, or tilt warning). The message may be a status of the vehicle (e.g., tilt or level). The message status may be indicated by a colored light (e.g., red for tilt). The message may be presented by a display on the vehicle 100.

The grade severity message may include performance data recorded or otherwise sent to a manufacturer or operator. For example, data for the grade severity may be sent through the Internet, cellular, or other communication to a central server. The controller 200 may log the data and send the data to the central server and predetermined intervals or when connected to a service device.

The controller 200 may activate or deactivate the grade severity control system in response to a status of the battery 213. The controller 200 or a battery testing circuit may determine the level of charge of the battery 213. Because a fully charged battery inhibits regenerative braking, the grade severity control system may only be needed when the battery 213 is fully charged. The controller 200 may determine whether the charge on the battery exceeds a threshold charging level. When the battery charge level on the battery 213 exceeds the battery threshold, the controller 200 activates the grade severity control system. When the charge on the battery is less than the threshold, the controller 200 deactivates the grade severity control system.

The torque data may be noisy, and the motor position sensor is differentiated twice to get motor acceleration. For that reason, an appropriate filter may be applied to both signals. In some examples, a low pass filter is used. The filtering may be chosen with a similar time constant such that the signal stays phase-neutral. Other effects such as friction may be taken into account. This can be done by adding directional logic.

Figure 5:
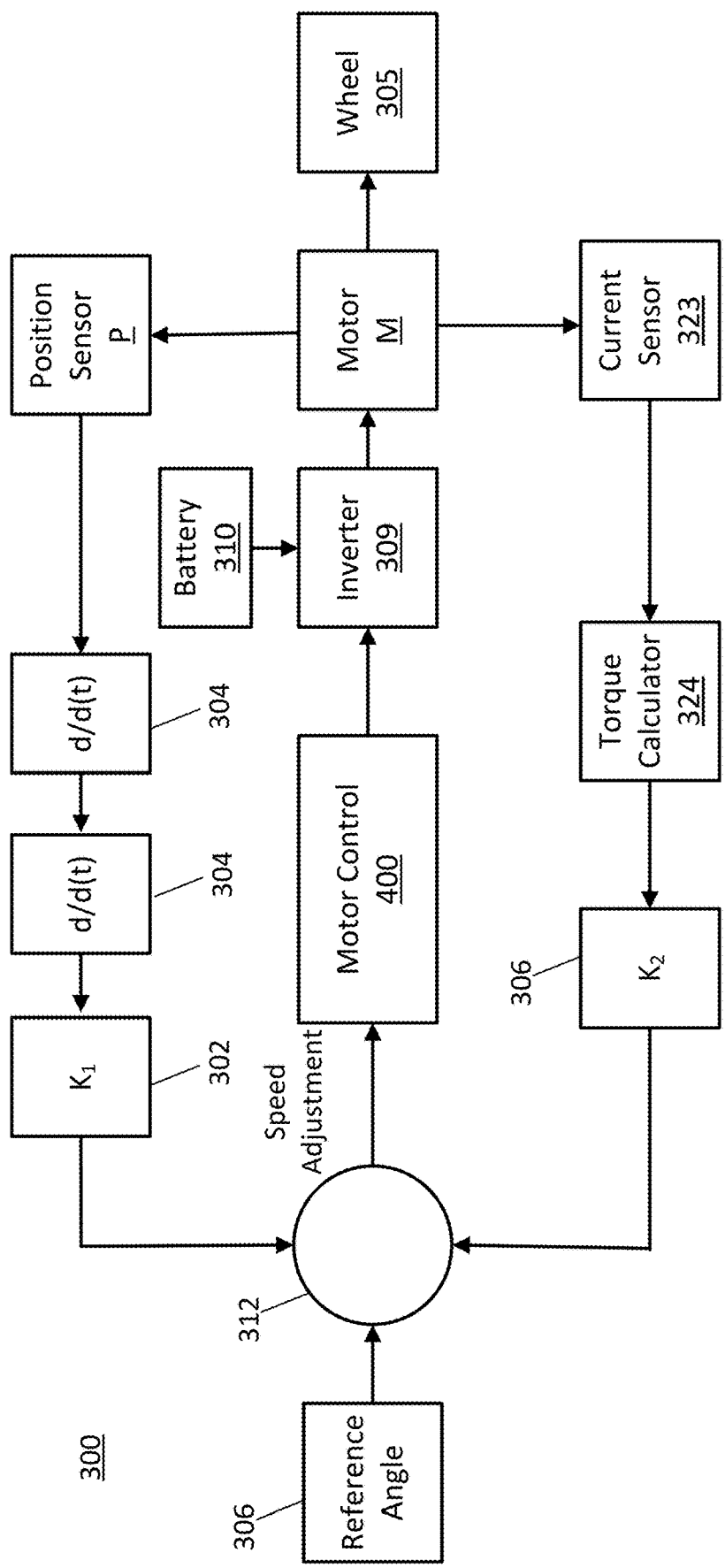
FIG. 5 illustrates an example block diagram of a first embodiment for monitoring grade severity.

FIG. 5 illustrates an example block diagram for a control system of a first embodiment for monitoring grade severity. The block diagram includes a current sensor 323 and position sensor P connected to the motor M, the wheel 305 associated with the motor M, or another part that can be sensed to measure the operation of the motor M. The torque calculator 324, which may be implemented by the same controller as other calculations described herein, receives sensor data from the current sensor 323 and calculates torque values from the sensor data. The combination of the current sensor 323 and the torque calculator 324 may be an example of the torque sensor T. The motor M may be an AC motor powered by battery 310 through inverter 309. The inverter 309 is configured to convert the DC output of the battery 310 to an AC power supply for the motor M. The inverter 309 may include an H-bridge or a rectifier. Additional, different, or fewer components may be used.

The block diagram also includes two feedback paths and a control path. The first feedback path is an acceleration feedback path including two differentiation blocks 304 and a gain block 302 representing the first factor K1. The second feedback path is a torque feedback path including a gain block 306 representing the second factor K2.

The control path may include a speed control block or motor controller 400. The grade severity control system may be applied on top of the motor controller 400. Alternately, the two may be integrated. The motor controller 400 includes a proportional integral (PI) controller and a pulse width modulation (PWM). In some examples, the "error component" used by the motor controller 400 triggers the operation of the grade severity detection. The error component may be difference between the commanded speed of the motor and the detected speed. When the error component exceeds a set value, the grade severity monitoring or detection is activated.

As a reference angle (e.g., threshold pitch for the vehicle 100) is provided to the control path, a summing block 312 combines the first feedback and the second feedback to determine if the feedback indicates that the vehicle 100 is at an angle that exceeds the threshold pitch. In some example, rather than the summing block 312, more complex circuitry or logic may be used. In addition, the speed adjustment may be made internal to the motor controller 400 with the reference angle and feedback paths being input directly to the motor controller 400. As shown, the determination is based on torque data with a gain of K2 and acceleration with a gain of K1. The summing block 312 may use addition or subtraction for each input.

The motor controller 400 may drive the motor M to a target speed. The motor controller 400 may monitor speed and vary the current to the motor M in response to the measured speed. The monitored speed may be applied to summing block 312 or internally within the motor controller 400.

Figure 6:
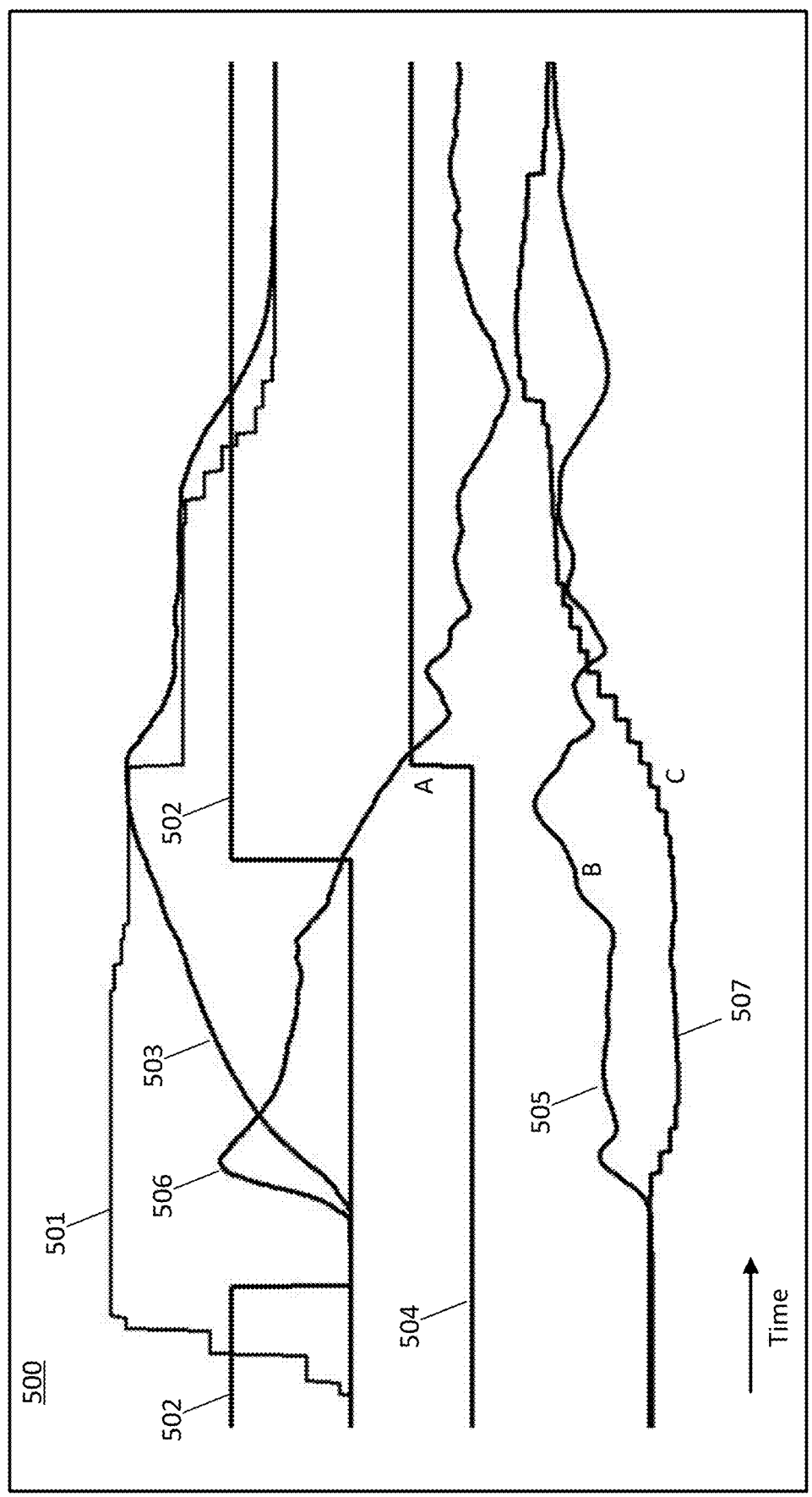
FIG. 6 illustrates a chart of vehicle parameters and vehicle grade or slope angle.

FIG. 6 illustrates a chart of vehicle parameters and vehicle grade or slope angle. A plot 501 represents the throttle/speed command. A plot 502 represents regenerative braking. A plot 503 represents the speed in revolutions per minute. A plot 506 represents the torque output at the motor M.

A plot 504 represents the vehicle state. At point A thee vehicle changes state. The plot 504 does not represent data or a signal of the control system but is rather a reference to show how the other plots react to the change of state of the vehicle.

A plot 505 represents grade severity output. A plot 507 represents the pitch angle from the tilt sensor. Point B along the grade severity output shows that the grade severity detection based on detected acceleration and torque responds more quickly to the incline of the vehicle that the tilt sensor, which beings to react at point C.

Figure 7:
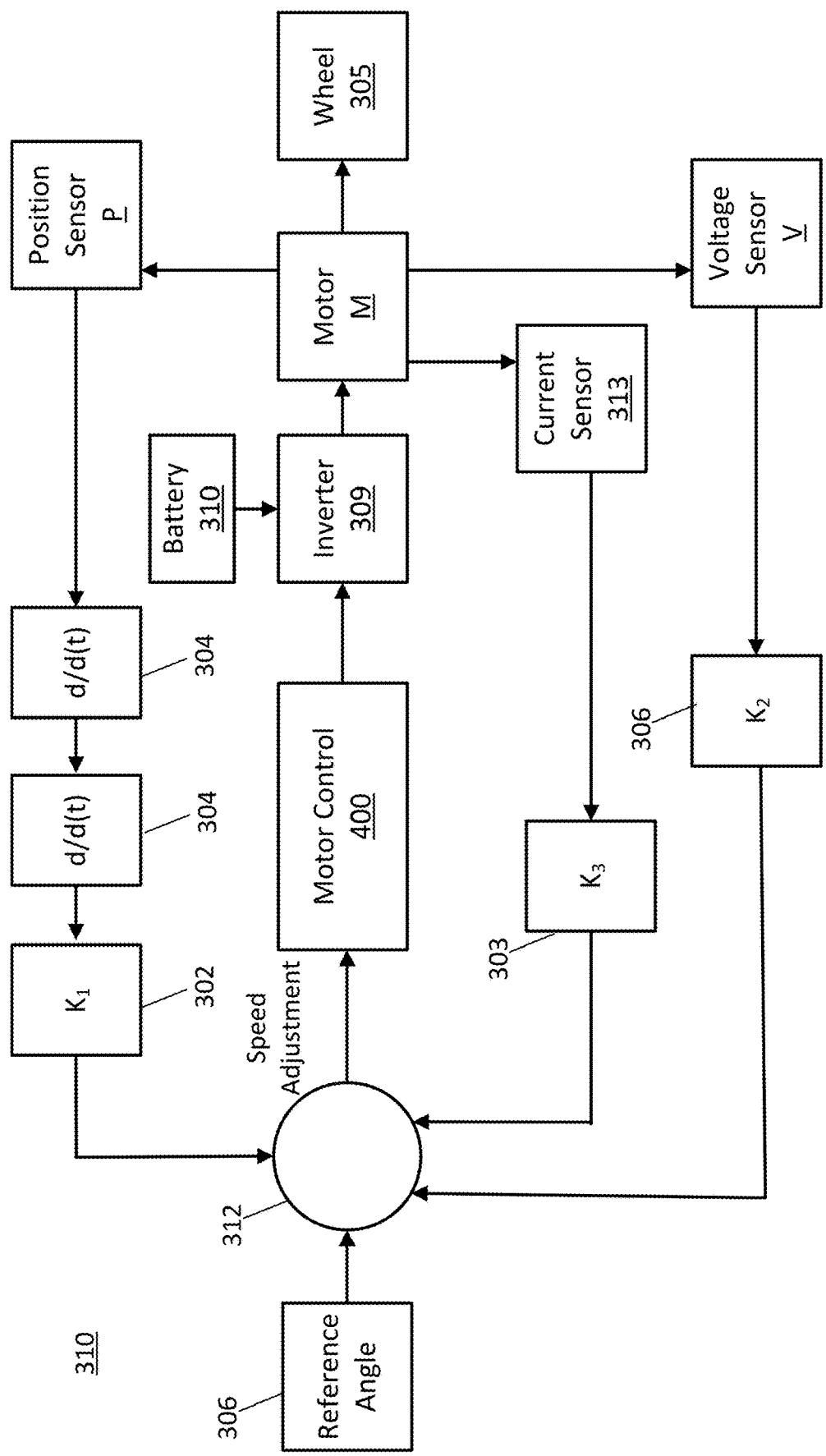
FIG. 7 illustrates an example block diagram of a second embodiment for monitoring grade severity.

FIG. 7 illustrates an example block diagram of a second embodiment for monitoring grade severity. In addition to the first feedback path (acceleration), and the second feedback path (current/torque), the example of FIG. 7 includes a third feedback path including a gain block 303 representing a gain K3 for voltage data detected by a voltage sensor V. The voltage data may be indicative of the operation of the motor M. The voltage data may alternatively be detected at the battery 310 and/or the inverter 309.

As a reference angle (e.g., threshold pitch for the vehicle 100) is provided to the control path, a summing block 312 combines the first feedback, the second feedback, and the third feedback to determine if the feedback indicates that the vehicle 100 is at an angle that exceeds the threshold pitch. As shown, the determination is based on torque data with a gain of K2, acceleration with a gain of K1, and motor current with a gain of K3. The summing block 312 may use addition or subtraction for each input.

Figure 8:
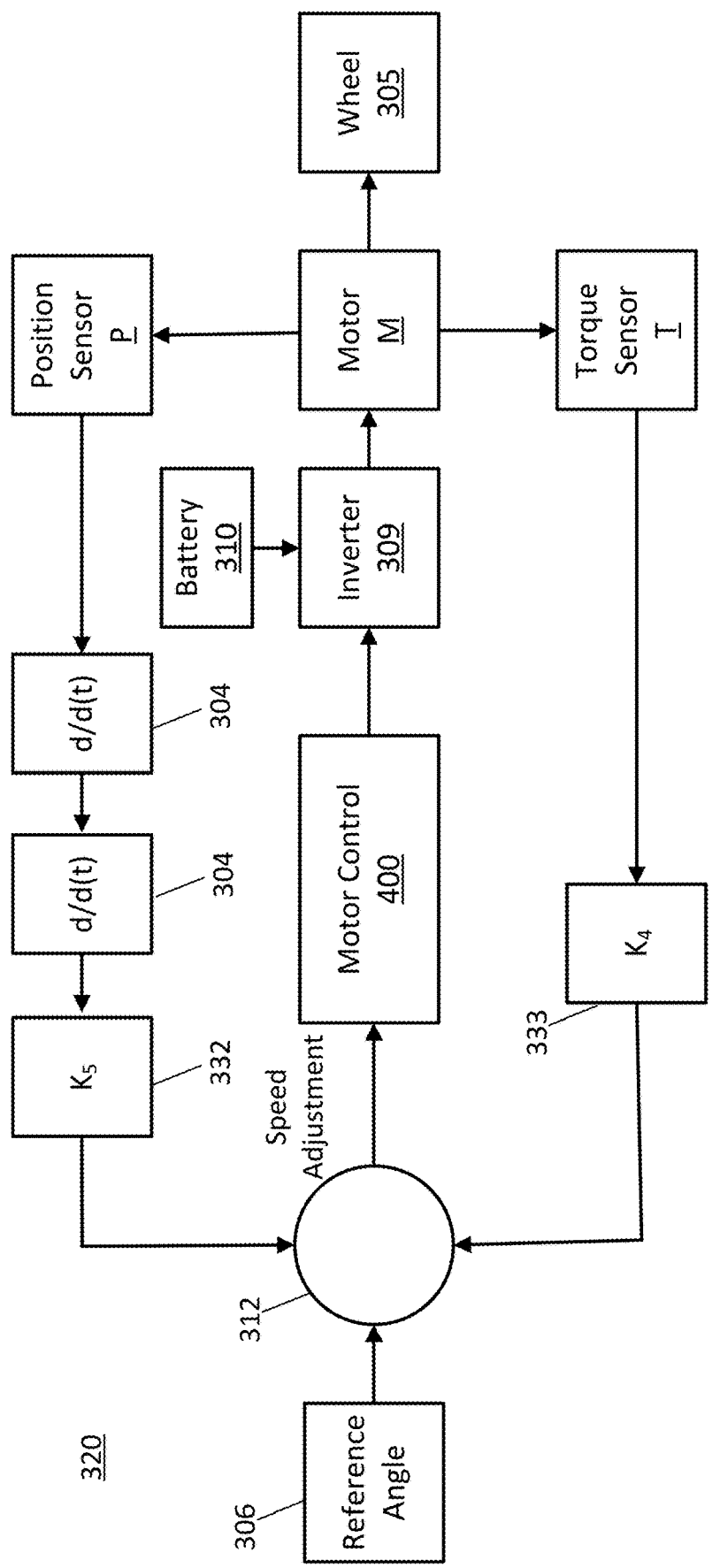
FIG. 8 illustrates an example block diagram of a third embodiment for monitoring grade severity.

FIG. 8 illustrates an example block diagram of a third embodiment for monitoring grade severity. In this example, the second feedback path includes a direct torque sensor T. Such a direct torque sensor T is configured to generate torque data for at least one wheel of the vehicle 100. The torque sensor T may measure torque applied to a component such as an axle/shaft, the gear box, transmission, wheel, motor, or another component. The torque sensor T may measure torque on the rotating shaft and utilize a non-contact power source for the torque sensor T through a slip ring or a rotary transformer.

As a reference angle (e.g., threshold pitch for the vehicle 100) is provided to the control path, a summing block 312 combines the position feedback and the torque feedback to determine if the feedback indicates that the vehicle 100 is at an angle that exceeds the threshold pitch. As shown, the determination is based on acceleration with a gain block 332 of K5, and motor current with a gain block 333 of K4. The summing block 312 may use addition or subtraction for each input.

Figure 9:
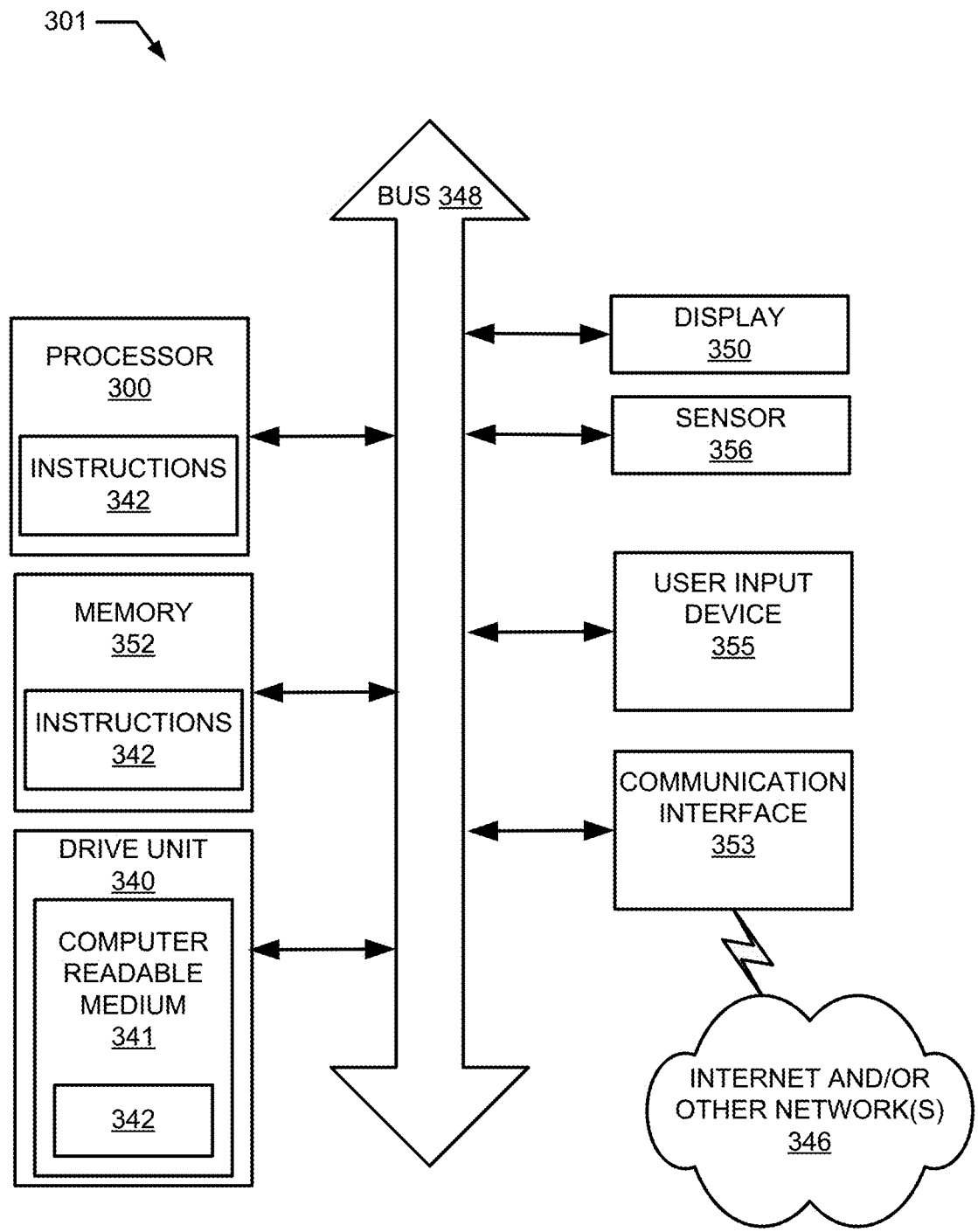
FIG. 9 illustrates an example controller for monitoring grade severity or vehicle performance.

FIG. 9 illustrates an example control system or controller 301 for the grade severity control system. The controller 301 may include a processor 300, a memory 352, and a communication interface 353 for interfacing with devices or to the internet and/or other networks 346. In addition to the communication interface 353, a sensor interface may be configured to receive data from the sensors described herein or data from any source for the position of the motorized vehicle 100, motor M, or wheel. The components of the control system may communicate using bus 348. The control system may be connected to a workstation or another external device (e.g., control panel) and/or a database for receiving user inputs, system characteristics, and any of the values described herein.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Figure 10:
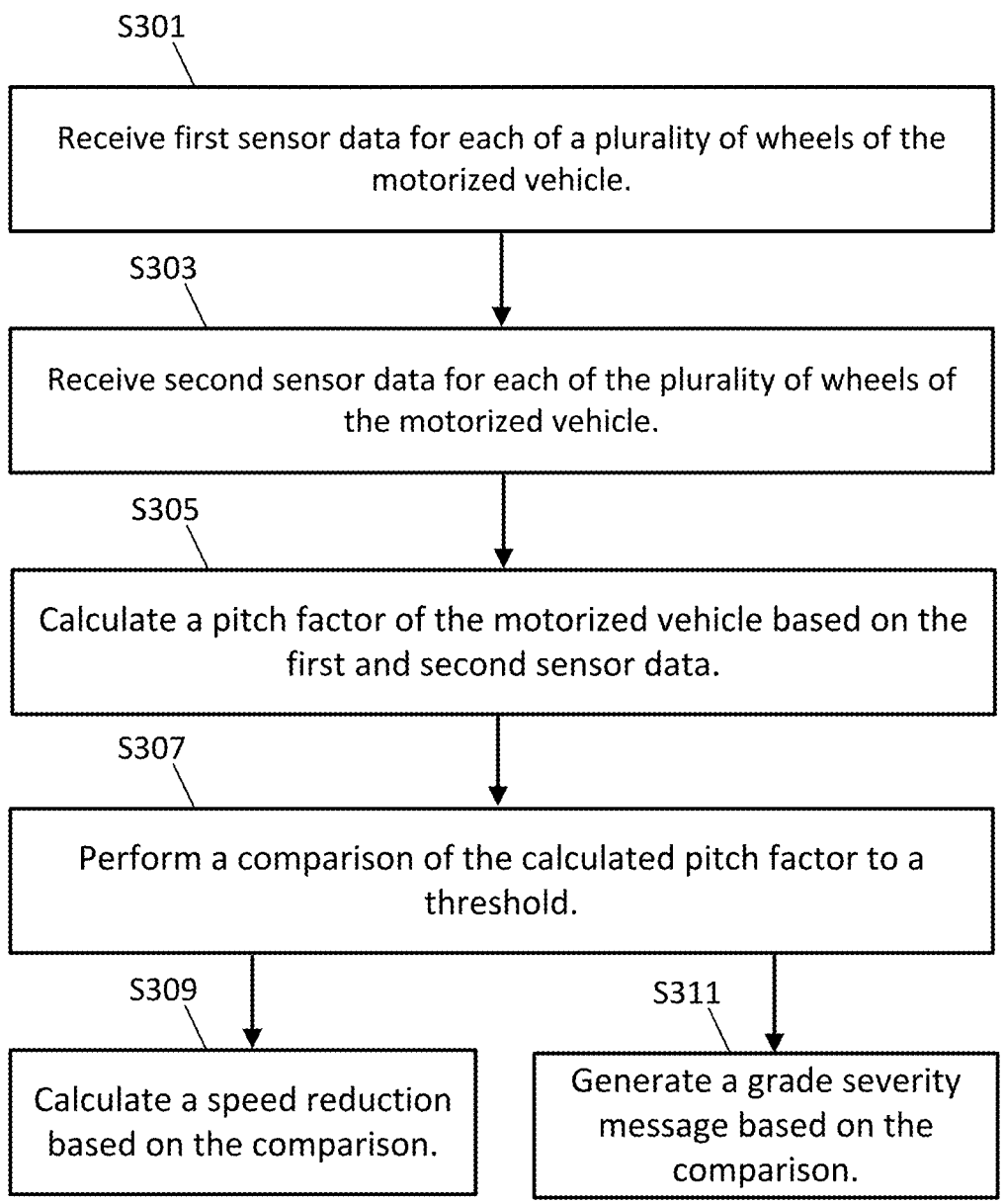
FIG. 10 illustrates a flow chart for the controller of FIG. 9.
Figure 11:
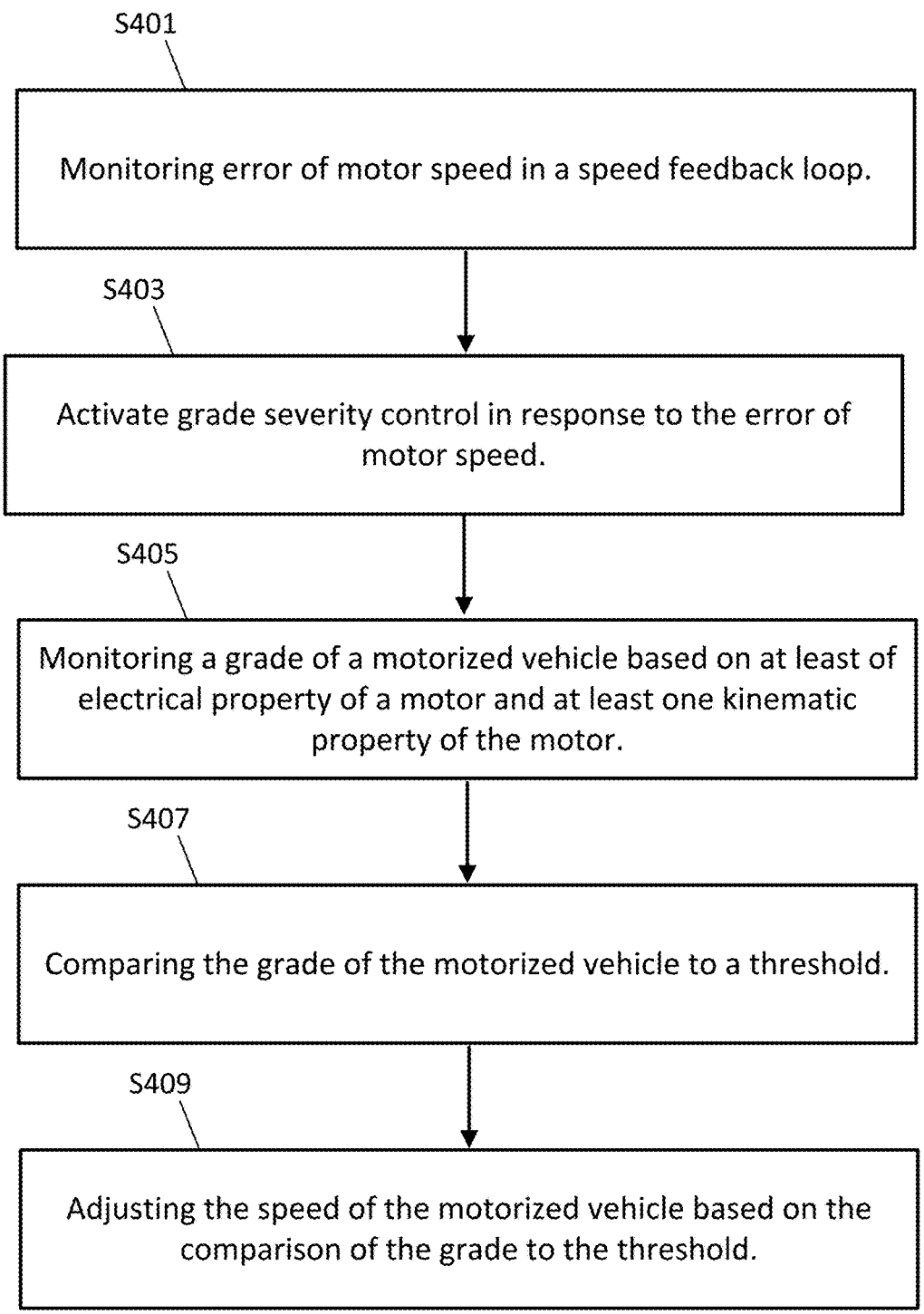
FIG. 11 illustrates another flow chart for the controller of FIG. 9.

FIG. 10 illustrates a flow chart for the controller 301 of the grade severity control system. The acts of the flow chart may be performed by any combination of the control system, the network device or the server. Portions of one or more acts may be performed by the appliance. Additional, different of fewer acts may be included.

At act S301, the controller 301 (e.g., through processor 300) receives first sensor data for each of a plurality of wheels of the motorized vehicle. The first sensor data may be a kinematic quantity such as position, speed, velocity, or acceleration. The motion data may be position data, which is differentiated once for velocity or twice for acceleration.

At act S303, the controller 301 (e.g., through processor 300) receives second sensor data for each of the plurality of wheels of the motorized vehicle. The second sensor data may be an electrical quantity such as motor current or motor voltage.

At act S305, the controller 301 (e.g., through processor 300) calculates a pitch factor of the motorized vehicle based on the first and second sensor data. The pitch factor may be an estimation of pitch, as described in other embodiments herein. The pitch factor may be any quantity that indicates pitch. For example, the pitch factor may be based on a combination of motor currents, voltage, rotor position, and motor temperature.

At act S307, the controller 301 (e.g., through processor 300) performs a comparison of the calculated pitch factor to a threshold. When the pitch factor exceeds the threshold, the controller 301 performs acts S308 and/or S311.

At act S309, the controller 301 (e.g., through processor 300) calculates a speed reduction based on the comparison. The speed reduction (e.g., a described above with respect to motor control 400) is a value to adjust the current speed of the motor and/or a commanded speed of the motor in order to slow down the motor, and in turn, slow down the motorized vehicle. Thus, rather than calculate or estimate the pitch of the motorized vehicle, here the inputs from acts S301 and S303 are compared to the threshold in act S307 to directly adjust the speed of the motor in act S309.

At act S311, the controller 301 (e.g., through processor 300) generates a grade severity message based on the comparison. The grade severity message may be any of the examples described herein including messages to the user, a manufacturer, or a braking system.

FIG. 10 illustrates a flow chart for the controller 301 of the grade severity control system. The acts of the flow chart may be performed by any combination of the control system, the network device or the server. Portions of one or more acts may be performed by the appliance. Additional, different of fewer acts may be included.

At act S401, the controller 301 (e.g., through processor 300) monitoring an error of motor control in a speed feedback loop. The error of motor control may be a current error or a speed error. The error of motor speed may be the difference between a commanded speed and a detected speed. When the error of motor speed exceeds a threshold, the controller 301, at act S403, the controller 301 (e.g., through processor 300) activates grade severity control in response to the comparison of the error of motor speed to the threshold. The activated grade severity control may be the sequence in acts S405-409. Alternatively, the activated grade severity control may be the sequence in acts S301-311 or any other example described herein.

At act S405, the controller 301 (e.g., through processor 300) monitoring a grade of a motorized vehicle based on at least of electrical property of a motor and at least one kinematic property of the motor. The at least one electrical property off the motor includes a motor current and the at least one kinematic property of the motor includes an angular acceleration.

At act S407, the controller 301 (e.g., through processor 300) compares the grade of the motorized vehicle to a threshold. At act S409, the controller 301 (e.g., through processor 300) adjusts the speed of the motorized vehicle based on the comparison of the grade to the threshold.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus for grade severity detection in a motorized vehicle, the apparatus comprising:
    a first sensor configured to generate motion data indicative of at least one wheel of the motorized vehicle;
    a second sensor, wherein torque data for the at least one wheel of the motorized vehicle is based on an output of the second sensor; and
    a controller configured to calculate a grade of a surface upon which the motorized vehicle is traveling based on the torque data and one or more acceleration values derived from the motion data, and configured to perform a comparison of the calculated grade to a grade threshold,
    wherein a grade severity message is generated based on the comparison, and
    wherein a speed of the motorized vehicle is adjusted based on the comparison.

2. The apparatus of claim 1, wherein the controller is configured to differentiate the motion data at least once to determine the one or more acceleration values of the motorized vehicle.

3. The apparatus of claim 1, wherein the grade severity message is provided to a speed control feedback loop for a motor associated with the at least one wheel.

4. The apparatus off claim 1, wherein the grade severity message is provided to a brake associated with the at least one wheel.

5. The apparatus of claim 1, further comprising:
    a display configured to provide a status of the motorized vehicle, wherein the status is derived at least in part from the grade severity message.

6. The apparatus of claim 1, wherein the grade severity message is provided to a central server.

7. The apparatus of claim 1, wherein the grade threshold is selected from a grade range spanning a minimum grade threshold value and a maximum grade threshold value.

8. The apparatus of claim 1, wherein the controller performs the comparison at a time interval based on a previous comparison of the calculated grade to the grade threshold.

9. The apparatus of claim 1, wherein the controller determines a battery charge level and disables the comparison of the calculated grade to the grade threshold or disables the grade severity message when the battery charge level is below a battery threshold.

10. The apparatus of claim 1, wherein the motorized vehicle is a mobile elevating work platform.

11. The apparatus of claim 1, wherein the motion data is collected at a motor associated with the at least one wheel.

12. The apparatus of claim 1, wherein the controller is configured to apply a first factor to the one or more acceleration values and apply a second factor to the torque data for the calculation of the grade.

13. The apparatus of claim 12, wherein the controller is configured to query a lookup table for the first factor and the second factor according to a model of the motorized vehicle.

14. A method for grade severity detection in a motorized vehicle, the method comprising:
    receiving first data for each of a plurality of wheels of the motorized vehicle, the first data indicative of torque;
    receiving motion data for each of the plurality of wheels of the motorized vehicle;
    calculating a wheel acceleration from the motion data;
    calculating a grade of a surface upon which the motorized vehicle is traveling based on the wheel acceleration and the torque data;
    performing a comparison of the calculated grade to a grade threshold; and
    generating a grade severity message based on the comparison;
    wherein a speed of the motorized vehicle is adjusted based on the comparison.

15. The method of claim 14, wherein calculating wheel acceleration from the motion data further comprises:
    differentiating the motion data to determine one or more velocity values for the motorized vehicle; and
    differentiating the one or more velocity values to determine the wheel acceleration of the motorized vehicle.

16. The method of claim 14, further comprising:
    providing the grade severity message to a speed control feedback loop for a motor associated with the plurality of wheels.

17. The apparatus of claim 1, wherein the adjustment of the speed of the motorized vehicle is a decreasing of the speed of the motorized vehicle.

* * * * *